United States Patent
Shen et al.

(10) Patent No.: US 10,862,379 B2
(45) Date of Patent: Dec. 8, 2020

(54) STATOR ASSEMBLING METHOD FOR MOTOR, STATOR STRUCTURE FOR MOTOR, AND CRIMP TERMINAL

(71) Applicant: Tyco Electronics Japan G.K., Kanagawa (JP)

(72) Inventors: Zhonghuan Shen, Kanagawa (JP); Keita Terajima, Kanagawa (JP); Taisuke Nagasaki, Kanagawa (JP)

(73) Assignee: Tyco Electronics Japan G.K., Kawasaki (JP)

( * ) Notice: Subject to any disclaimer, the term of this patent is extended or adjusted under 35 U.S.C. 154(b) by 512 days.

(21) Appl. No.: 15/609,716

(22) Filed: May 31, 2017

(65) Prior Publication Data

US 2017/0353088 A1    Dec. 7, 2017

(30) Foreign Application Priority Data

Jun. 2, 2016 (JP) .................. 2016-110730

(51) Int. Cl.

| | | |
|---|---|---|
| *H02K 3/50* | (2006.01) | |
| *H02K 15/00* | (2006.01) | |
| *H02K 3/52* | (2006.01) | |
| *H01R 4/2495* | (2018.01) | |
| *H02K 3/28* | (2006.01) | |

(Continued)

(52) U.S. Cl.
CPC ....... *H02K 15/0068* (2013.01); *H01R 4/2495* (2013.01); *H02K 3/28* (2013.01); *H02K 3/522* (2013.01); *H02K 5/225* (2013.01); *H02K 15/02* (2013.01); *H02K 2203/09* (2013.01)

(58) Field of Classification Search
CPC .......... H01R 4/2495; H02K 3/28; H02K 3/50; H02K 15/0068

See application file for complete search history.

(56) References Cited

U.S. PATENT DOCUMENTS 3,963,857 A  *  6/1976  Reynolds .................. H01F 5/04
174/84 C
2015/0145360 A1    5/2015  Okada et al.

FOREIGN PATENT DOCUMENTS

| JP | 62-201032 A | 9/1987 |
| JP | 63-79058 U | 5/1988 |
| JP | 2003-23759 A | 1/2003 |

(Continued)

OTHER PUBLICATIONS

Japanese Office Action, Japanese Patent Application No. 2016-110730, dated Oct. 23, 2019, 4 pages.

(Continued)

*Primary Examiner* — Ramon M Barrera
(74) *Attorney, Agent, or Firm* — Barley Snyder

(57) ABSTRACT

A method for assembling a stator structure of a motor comprises providing a stator coil and a stator frame. The stator coil has a wire with an end segment and the stator frame includes a connector and a conductor. The conductor has an open-barrel crimping portion and a temporary holding portion. The method further comprises positioning the end segment of the wire in the crimping portion and a tip end of the end segment in the temporary holding portion. The method further comprises crimping the crimping portion to the end segment of the wire to electrically connect the connector and the end segment of the wire by penetrating an insulating coating of the end segment.

5 Claims, 7 Drawing Sheets

(51) Int. Cl.
*H02K 5/22* (2006.01)
*H02K 15/02* (2006.01)

(56) References Cited

FOREIGN PATENT DOCUMENTS

| JP | 2003333781 A | 11/2003 |
| JP | 2015-104284 A | 6/2015 |
| JP | 2016-1551 A | 1/2016 |

OTHER PUBLICATIONS

Abstract of JP 2016-1551 A1, dated Jan. 7, 2016, 1 page.
Abstract of JP 2003-23759 A, dated Jan. 24, 2003, 1 page.
Abstract of JP2003333781, dated Nov. 21, 2003, 2 pages.

* cited by examiner

STATOR ASSEMBLING METHOD FOR MOTOR, STATOR STRUCTURE FOR MOTOR, AND CRIMP TERMINAL

CROSS-REFERENCE TO RELATED APPLICATION

This application claims the benefit of the filing date under 35 U.S.C. § 119(a)-(d) of Japanese Patent Application No. 2016-110730, filed on Jun. 2, 2016.

FIELD OF THE INVENTION

The present invention relates to a stator of a motor and, more particularly, to the assembly of the stator.

BACKGROUND

When a stator of a motor is assembled, a coil of the stator is connected to a connector forming an electrical connection with an element exterior of the stator. In known stators, the connector is part of a frame of the stator, the frame also having a conductor connecting an end of a wire of the coil with the connector. The stator frame is disposed in a position contiguous with the coil. The coil and frame are connected by stripping an insulating coating of the wire and soldering the wire to the conductor. This known method of assembly, however, is inefficient.

Japanese Patent No. 2015-104284A discloses a stator assembly in which the conductor of the frame has a crimping portion crimped to the coil. In order to securely achieve this crimping connection, it is necessary to ensure that the wire of the coil is disposed in a barrel of the crimping portion before crimping. However, it is difficult to dispose the wire stably in the barrel of the crimping portion because the wire has low rigidity and consequently poor posture stability. The crimping connection consequently does not improve the efficiency of assembling the stator.

SUMMARY

An object of the invention, among others, is to provide a more efficient stator assembly method and stator structure. A method for assembling a stator structure of a motor according to the invention comprises providing a stator coil and a stator frame. The stator coil has a wire with an end segment and the stator frame includes a connector and a conductor. The conductor has an open-barrel crimping portion and a temporary holding portion. The method further comprises positioning the end segment of the wire in the crimping portion and a tip end of the end segment in the temporary holding portion. The method further comprises crimping the crimping portion to the end segment of the wire to electrically connect the connector and the end segment of the wire by penetrating an insulating coating of the end segment.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
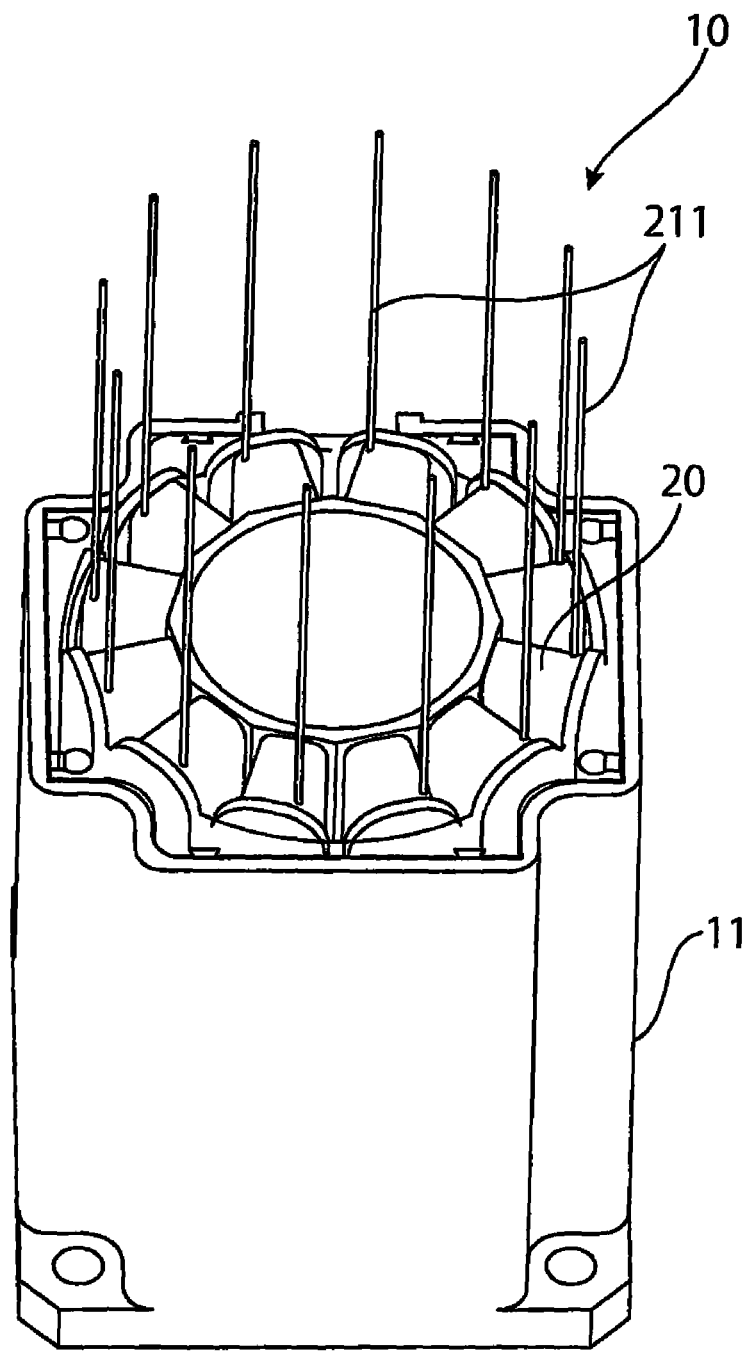
FIG. 1 is a perspective view of a motor with a stator structure according to the invention having stator coils.
Figure 2:
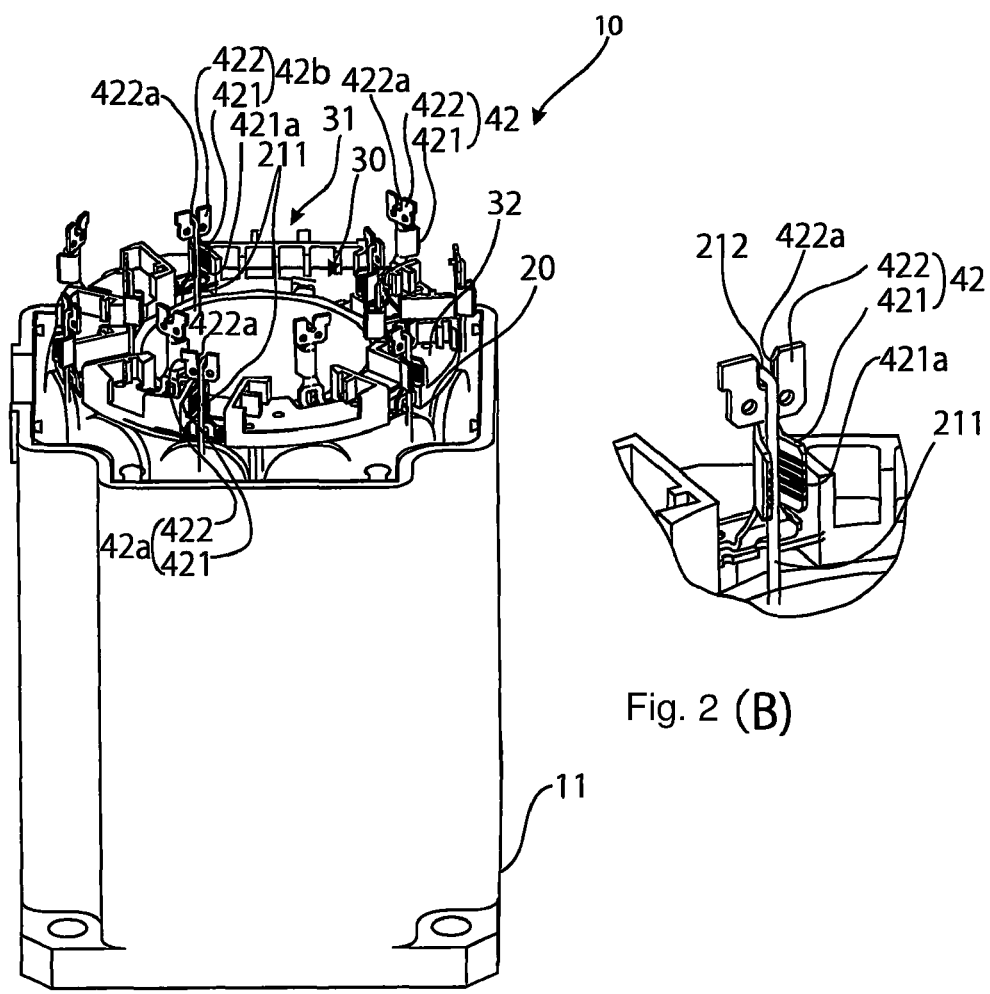
FIG. 2A is a perspective view of a stator frame disposed on the stator coils.
FIG. 2B is an enlarged perspective view of a crimp terminal of the stator frame of FIG. 2A.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

A motor 10 according to the invention is shown in FIGS. 1-7B. The motor 10 includes a housing 11 and a stator structure 20, 30. The stator structure 20, 30 includes a plurality of stator coils 20 and a stator frame 30. The assembly of a stator structure 20, 30 within the motor 10 will now be described in greater detail with reference to FIGS. 1-7B.

In an initial state of assembly, the stator coils 20 are disposed in the housing 11, as shown in FIG. 1. The housing 11 is an exterior portion of the motor 10. Each stator coil 20 has a wound wire, and an end segment 211 of the wire projects from the housing 11 and extends upward. In FIG. 1, the end segment 211 of the wire extends vertically upward. However, in practice, the posture of the end segment 211 of the wire is not stable because of low rigidity of the end segments 211; the end segments 211 of the wires extend upward as a whole while bending individually in various directions.

The stator frame 30, as shown in FIGS. 2A and 2B, is then disposed on the stator coils 20. The stator frame 30 has a connector 31, a plate 32, and a plurality of conductors 41, 42. The connector 31 forms an exterior electrical connection by connecting the motor 10 to a circuit outside the motor 10. The plate 32 is made of insulating resin and has an approximately flat, annular shape. The stator frame 30 is disposed in a position adjacent to the stator coils 20 with a first face of the plate 32 facing the stator coils 20.

The conductors 41, 42 electrically connect the end segment 211 of the wire of the stator coil 20 and the connector 31. Each conductor 41, 42, as shown in FIGS. 2A and 2B, is insert-molded in the plate 32, having both its ends exposed. A first end of the conductor 41, 42 on the connector 31 side is a contact 41, shown in FIG. 3, connected to the connector 31. An opposite second end of the conductor 41, 42 is a crimp terminal 42 for crimping the end segment 211 of the wire of the stator coil 20.

The crimp terminal 42, as shown in FIGS. 2A and 2B, is formed in a shape extending from the plate 32, where the crimp terminal 42 has an open-barrel type crimping portion 421 and a temporary holding portion 422. The crimping portion 421 has serrations 421a on its inner face for cutting through an insulating coating of the wire, and is crimped to the end segment 211 of the wire of the stator coil 20. The temporary holding portion 422 is disposed at a distal end of the wire from the crimping portion 421 along an extending direction of the end segment 211 of the wire.

The temporary holding portion 422, as shown in FIG. 2B, receives a tip end 212 of the end segment 211 of the wire disposed in the crimping portion 421 and temporarily holds the tip end 212. The temporary holding portion 422 is bifurcated; by hooking the tip end 212 of the wire onto a temporary holding groove 422a formed between the bifurcations, the tip end 212 of the wire is temporarily held in the temporary holding portion 422. This enables the end segment 211 of the wire to be disposed stably in the barrel of the crimping portion 421. In an embodiment, a width of the temporary holding portion 422a is 1.1 to 5 times larger than a diameter of the wire, but may be approximately equal to the diameter of the wire so that the wire can be press-fitted in the temporary holding groove 422a.

The crimp terminals 42 provided with the crimping portion 421 and the temporary holding portion 422, as shown in FIG. 2A, include an outer-circumferential side crimp terminal 42a disposed along the outer circumference of the annular plate 32 and an inner-circumferential side crimp terminal 42b disposed along the inner circumference of the plate 32. The crimping portion 421 of the outer-circumferential side crimp terminal 42a has a barrel opened radially outward. The crimping portion 421 of the inner-circumferential side crimp terminal 42b has a barrel opened radially inward.

Figure 3:
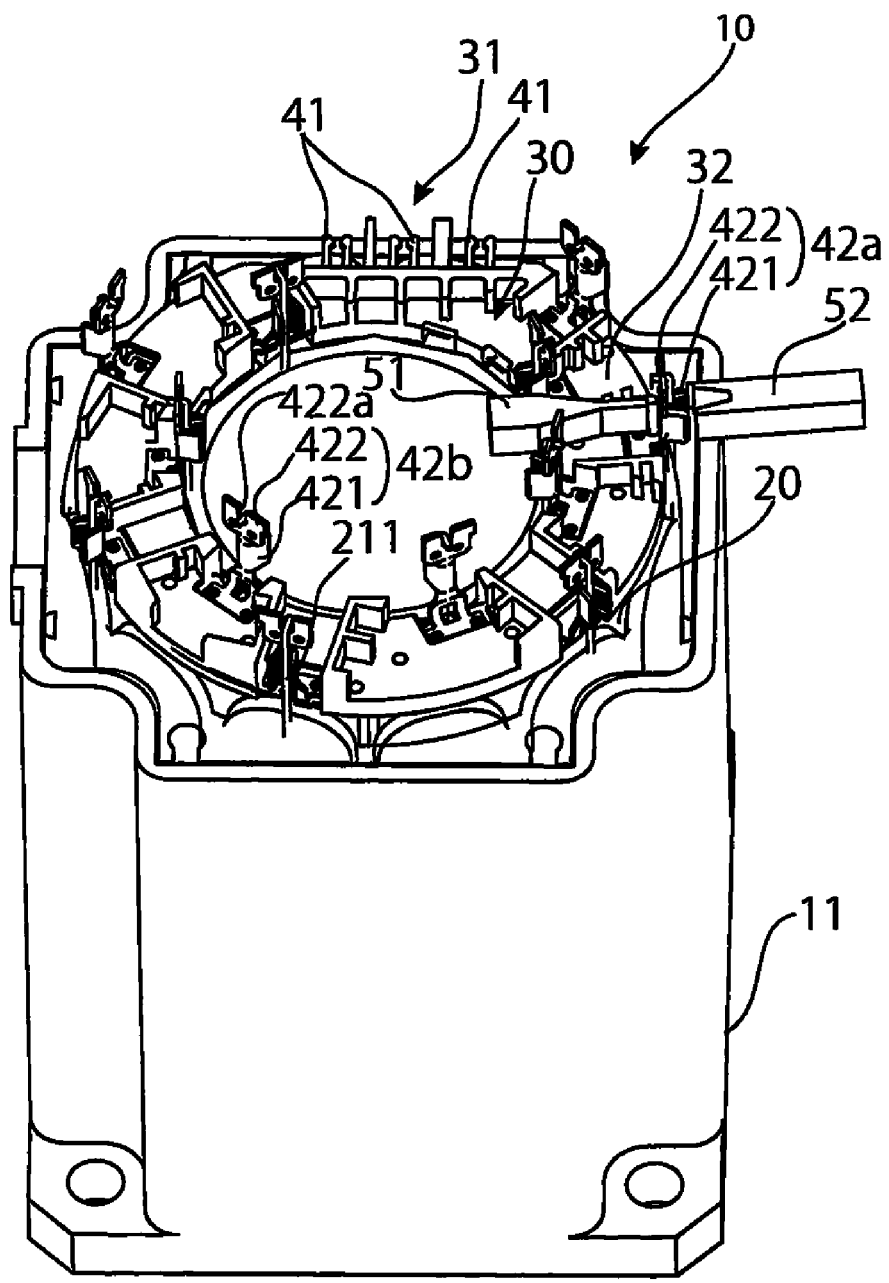
FIG. 3 is a perspective view of a crimping connection of an outer-circumferential side crimp terminal.
Figure 4:
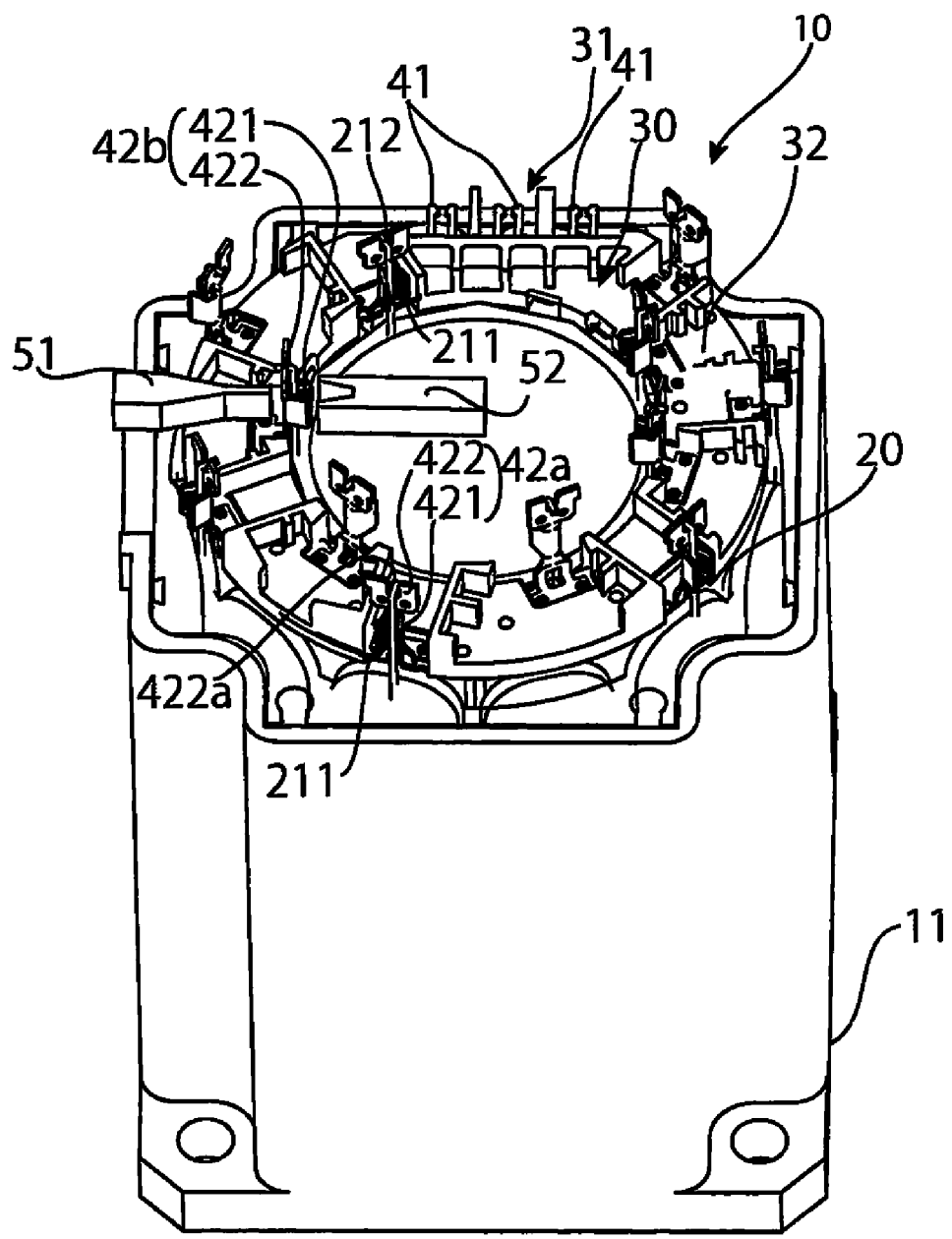
FIG. 4 is a perspective view of a crimping connection of an inner-circumferential side crimp terminal.
Figure 5:
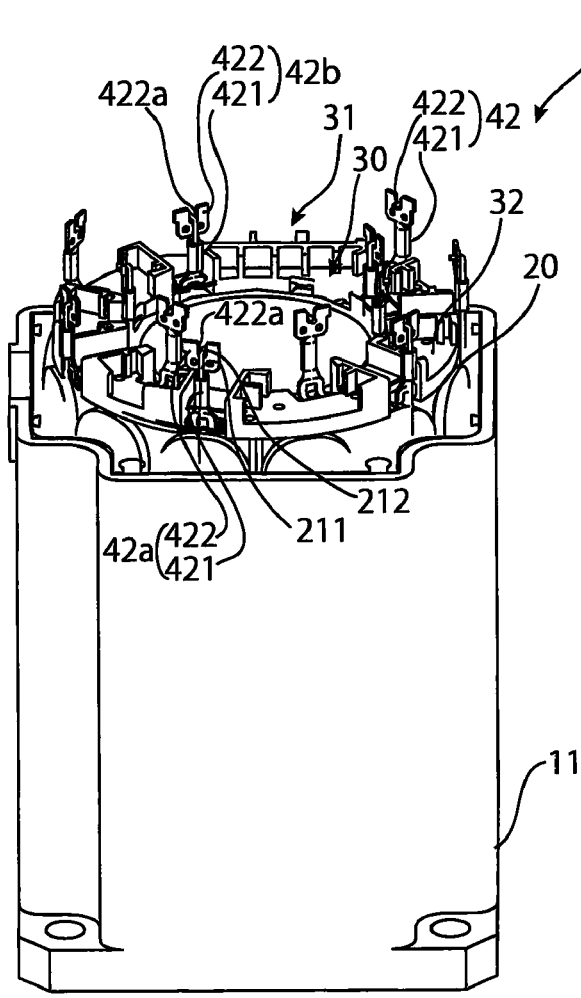
FIG. 5A is a perspective view of the motor after crimping.
FIG. 5B is an enlarged perspective view of the inner-circumferential side crimp terminal after crimping.
FIG. 5C is an enlarged perspective view of the outer-circumferential side crimp terminal after crimping.
Figure 5:
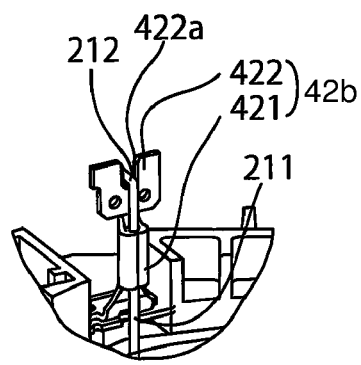
Figure 5:
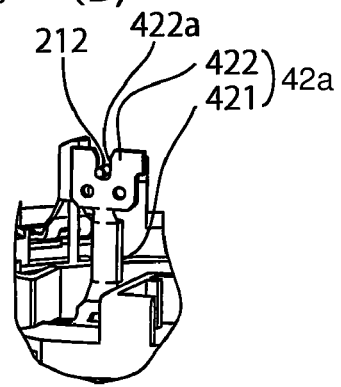
Figure 6:
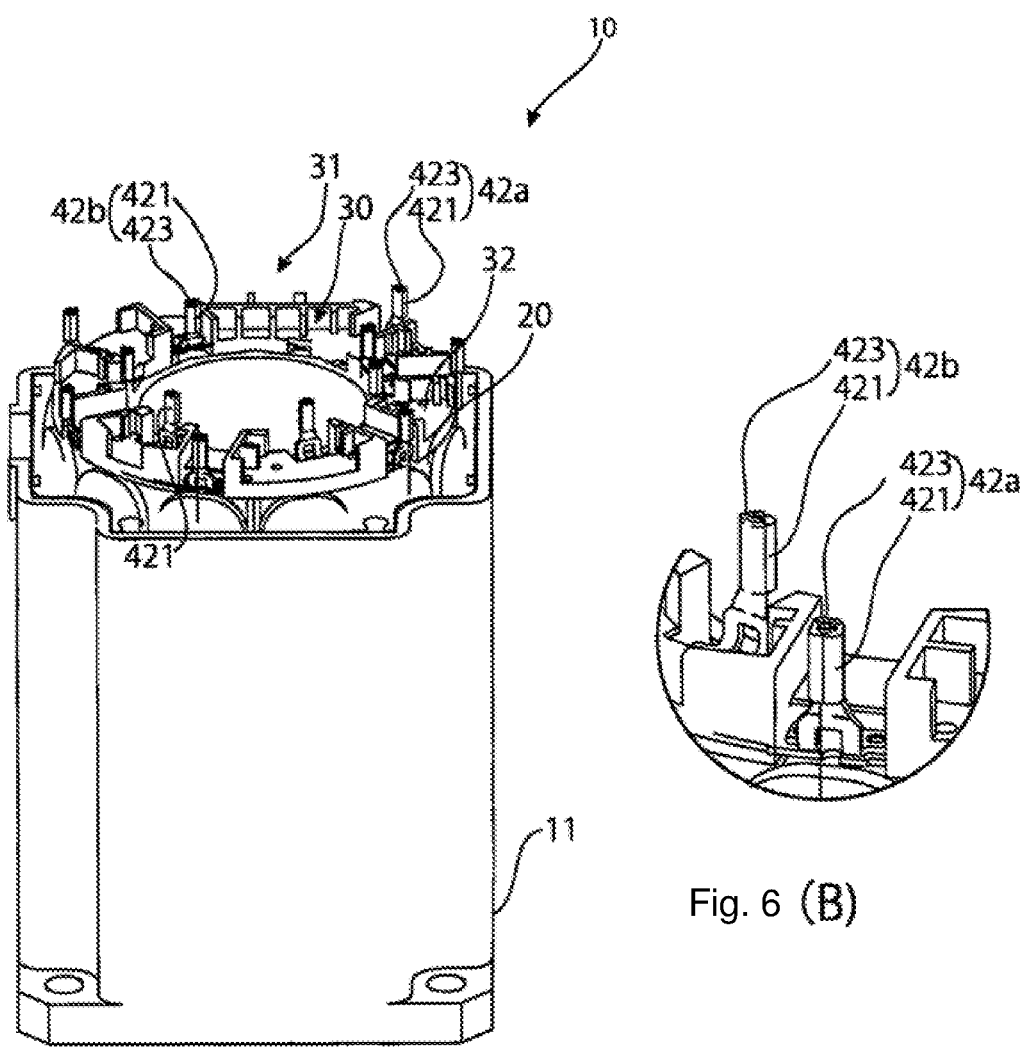
FIG. 6A is a perspective view of the motor after a temporary holding portion of the crimp terminal is removed.
FIG. 6B is an enlarged perspective view of the crimp terminal with the temporary holding portion removed.
Figure 7:
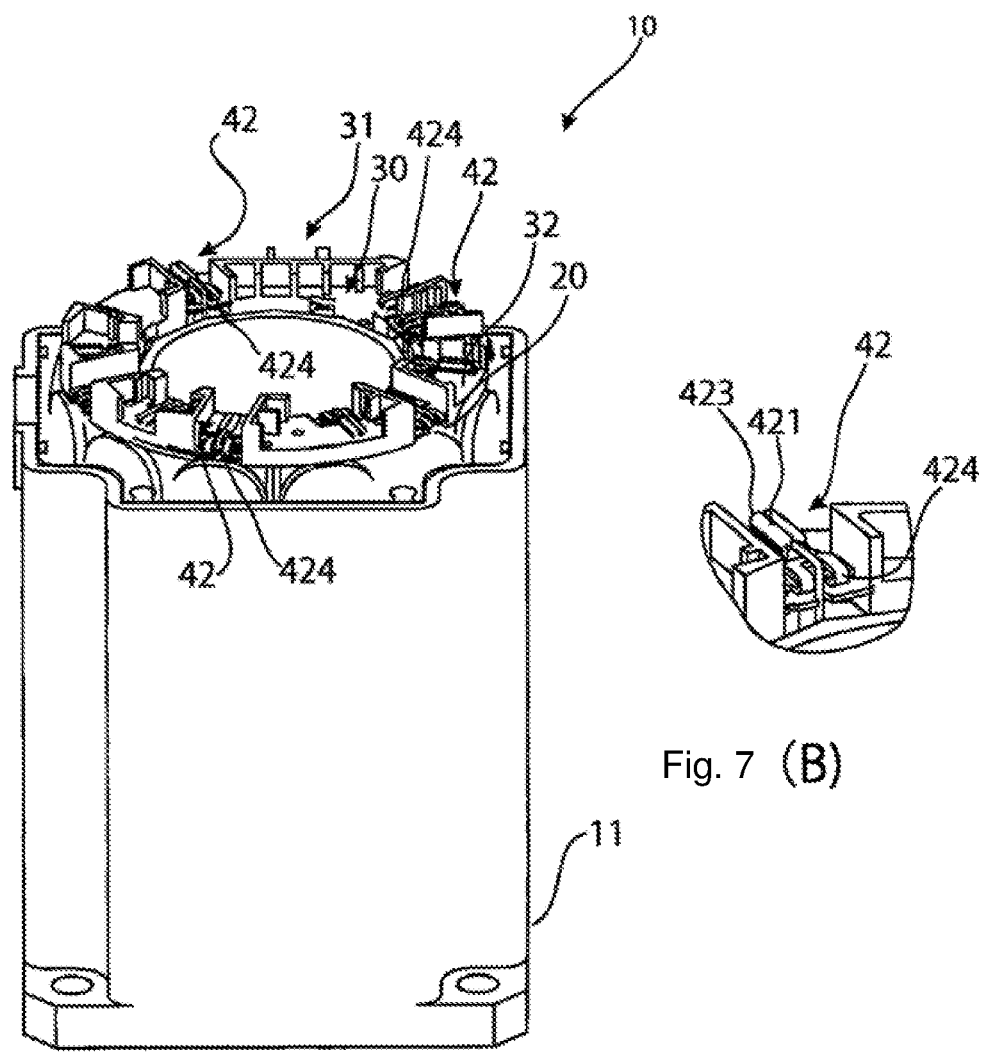
FIG. 7A is a perspective view of the motor after a bending portion of the crimp terminal is formed.
FIG. 7B is an enlarged perspective view of the bending portion of the crimp terminal.

The crimping of the crimp portion 421 to the end segment 211 of the wire is shown in FIGS. 3 and 4. An anvil 51 is positioned against a back side of the barrel of the crimping portion 421 of the outer-circumferential side crimp terminal 42a from a central side of the motor 10, as shown in FIG. 3, and a bifurcated crimper 52 is pressed against an open side of the barrel from the outside of the motor 10. The crimping portion 421 of the outer-circumferential side crimp terminal 42a is thus crimped to the end segment 211 of the wire. The crimping portion 421 of the inner-circumferential side crimping terminal 42b has the barrel opened radially inward. The anvil 51 is positioned against a back side of the barrel of the crimping portion 421 of the inner-circumferential side crimping terminal 42b from the outside of the motor 10, as shown in FIG. 4, and the crimper 52 is pressed against an open side of the barrel from the central side of the motor 10. The crimping portion 421 of the inner-circumferential side crimp terminal 42b is thus crimped to the end segment 211 of the wire. Since the crimping shown in FIG. 3 or FIG. 4 is performed with the tip end 212 of the wire temporarily held by the temporarily holding portion 422, the end segment 211 of the wire is reliably crimped to the crimping portion 421.

The crimping portions 421 are shown after crimping in FIGS. 5A-5C. Both the outer-circumferential side crimp terminal 42a and the inner-circumferential side crimp terminal 42b conduct electricity to the wires through the crimping portions 421 penetrating the insulating coatings of the end segments 211 of the wires.

The temporary holding portions 422, as shown in FIGS. 6A and 6B, are then removed. The temporary holding portion 422 stabilizes the posture during crimping of the end segment 211 of the wire and becomes useless once the crimping is completed. In the interest of minimizing a size of the motor 10, the temporary holding portions 422 are cut off and removed. By this cutting, a terminal portion 423 terminating flush with an end edge of the wire is formed in the crimp terminal 42.

After the temporary holding portions 422 are removed, a bending portion 424 is formed on each crimping portion 421 as shown in FIGS. 7A and 7B. The bending portion 424 is formed on the far side of the crimping portion 421 from the terminal portion 423, that is, between a portion of the conductor 41, 42 embedded in the plate 32 and the crimping portion 421. The bending portion 424 is bent with the crimping portions 421 along a second face of the plate 32 opposite to the first face facing the stator coils 20. The formation of the bending portion 424 reduces a projection distance of the conductor 41, 42 from the housing 11, contributing to a smaller size of the motor 10. The completed assembly of the stator structure 20, 30 within the motor 10 is shown in FIGS. 7A and 7B.

The embodiment shown in FIGS. 1-7B is a structure with the stator frame 30 having both the outer-circumferential side crimp terminal 42a along the outer circumference of the annular plate 32 and the inner-circumferential side crimping portion 42b along the inner circumference thereof, however, the present invention is not limited to the shown number or arrangement of the crimping terminals 42. Moreover, the cutting and bending of the temporary holding portions 422 is not necessarily required. The embodiment shown in FIGS. 1-7B additionally describes the crimping terminal 42 applied to the stator frame 30 of the motor 10, however, the crimping terminal 42 of the present invention is widely applicable not only to the motor 10 but also to any piece of equipment or apparatus having a wire to which a crimping connection is applied.

What is claimed is:

1. A stator structure for a motor, comprising:
   a stator coil having a wire with an end segment; and
   a stator frame having a connector forming an exterior electrical connection and a conductor, the conductor including a crimping portion crimped to the end segment of the wire and electrically connecting the connector and the wire and a temporary holding portion receiving and temporarily holding a tip end of the end segment.

2. The stator structure of claim 1, wherein the stator frame has a plate formed of an insulating resin in an approximately flat, annular shape.

3. The stator structure of claim 2, wherein a first face of the plate faces the stator coil.

4. The stator structure of claim 3, wherein a portion of the conductor is embedded in the plate and the crimping portion is disposed above an opposite second face of the plate.

5. The stator structure of claim 4, wherein the conductor has a bending portion positioned between the portion of the conductor embedded in the plate and the crimping portion, the bending portion bent such that the crimping portion is disposed along the second face of the plate.

* * * * *